(12) United States Patent  
Katsuki (10) Patent No.: US 8,391,119 B2  
(45) Date of Patent: Mar. 5, 2013

(54) APPARATUS AND METHOD FOR RECORDING/REPRODUCING OPTICAL INFORMATION, AND DATA FETCHING BY REFERENCE TO OPTICAL INFORMATION RECORDING MEDIUM

(75) Inventor: Manabu Katsuki, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 292 days.

(21) Appl. No.: 12/600,686

(22) PCT Filed: Aug. 5, 2008

(86) PCT No.: PCT/JP2008/064045  
§ 371 (c)(1),  
(2), (4) Date: May 17, 2010

(87) PCT Pub. No.: WO2009/041161  
PCT Pub. Date: Apr. 2, 2009

(65) Prior Publication Data  
US 2010/0226232 A1  Sep. 9, 2010

(30) Foreign Application Priority Data  
Sep. 28, 2007 (JP) .................... 2007-255675

(51) Int. Cl.  
*G11B 7/00* (2006.01)

(52) U.S. Cl. ........................................ 369/103

(58) Field of Classification Search .............. None  
See application file for complete search history.

(56) References Cited

U.S. PATENT DOCUMENTS

| | | | |
|---|---|---|---|
| 7,512,054 B2* | 3/2009 | Matsumoto et al. | 369/103 |
| 7,639,586 B2* | 12/2009 | Uno et al. | 369/103 |
| 2004/0179251 A1 | 9/2004 | Anderson et al. | |
| 2006/0114792 A1 | 6/2006 | Uno | |
| 2006/0171284 A1 | 8/2006 | Matsumoto | |
| 2006/0215527 A1 | 9/2006 | Uchida et al. | |
| 2006/0215528 A1 | 9/2006 | Hirao | |
| 2006/0280210 A1 | 12/2006 | Mizushima | |
| 2007/0146836 A1 | 6/2007 | Fukushima et al. | |
| 2008/0151337 A1 | 6/2008 | Kanazawa et al. | |
| 2008/0192311 A1 | 8/2008 | Horimai | |
| 2010/0226232 A1* | 9/2010 | Katsuki | 369/103 |

FOREIGN PATENT DOCUMENTS

| CN | 1783242 | 6/2005 |
|---|---|---|
| EP | 0 905 685 A1 | 3/1999 |

(Continued)

*Primary Examiner* — Peter Vincent Agustin  
(74) *Attorney, Agent, or Firm* — Antonelli, Terry, Stout & Kraus, LLP.

(57) ABSTRACT

Provided are an optical information recording/reproducing apparatus and method capable of managing a wavelength of a light source when information is recorded/reproduced by utilizing holography, and limiting a wavelength of an interference fringe in a medium, and an optical information recording medium. For information recording/reproducing relative to an optical information recording medium by a pickup, a wavelength detector circuit detects a reference wavelength recorded in a storage area of the optical information recording medium, in accordance with the detected reference wavelength, a controller adjusts a wavelength of a light source of the pickup to have an optimum wavelength, and if a temperature detected with a temperature sensor indicates a predetermined change, readjusts the wavelength of the light source of the pickup to have an optimum wavelength.

8 Claims, 8 Drawing Sheets

FOREIGN PATENT DOCUMENTS

| | | |
|---|---|---|
| JP | 11-149641 | 6/1999 |
| JP | 2004-272268 | 9/2004 |
| JP | 2005-011404 | 1/2005 |
| JP | 2005-116063 | 4/2005 |
| JP | 2006-155831 | 6/2006 |
| JP | 2006-268907 | 10/2006 |
| JP | 2007-163643 | 6/2007 |
| JP | 2008-147387 | 6/2008 |
| JP | 2008-151941 | 7/2008 |
| WO | WO 2004/102542 A1 | 11/2004 |

* cited by examiner

APPARATUS AND METHOD FOR RECORDING/REPRODUCING OPTICAL INFORMATION, AND DATA FETCHING BY REFERENCE TO OPTICAL INFORMATION RECORDING MEDIUM

INCORPORATION BY REFERENCE

The present application claims priority from Japanese Patent Application Serial No. 2007-255675 filed on Sep. 28, 2007, the content of which is hereby incorporated by reference into this application.

TECHNICAL FIELD

The present invention relates to an apparatus and a method for recording and/or reproducing information into and/or from an optical information recording medium by utilizing holography, and an optical information recording medium.

BACKGROUND ART

Optical discs having a recording density of about 50 GB are now commercially available even for public use, which discs use blue-violet semiconductor laser beams and rely upon Blu-Ray Disc (BD) specifications, High Definition Digital Versatile Disc (HD DVD) specifications and the like.

Now, optical discs that will have a capacity as large as a Hard Disc Drive (HDD) having a capacity of e.g., 100 GB to 1 TB are desired.

However, in order to realize such an ultra high density of an optical disc, new storage techniques are required which are different from conventional high density techniques which resort to a shorter wavelength and a high objective lens NA.

Researches of next generation storage techniques are under progress, and holographic recording techniques have been paid attention.

The holographic recording techniques are techniques of superposing in a recording medium a signal beam having information on page data two-dimensionally modulated by a spatial light modulator and a reference beam and causing refraction index modulation in the recording medium in accordance with an interference fringe pattern formed upon superposition to thereby record information in the recording medium.

For information reproduction, upon application of the reference beam used for recording to the recording medium in the same layout, a diffraction beam is generated because holograms recorded in the recording medium function as diffraction grating. This diffraction beam is reproduced as the same beam as the recorded signal beam including phase information.

The reproduced signal beam is detected two-dimensionally at high speed with an optical detector such as CMOS and CCD. According to the holographic recording techniques, by using one hologram, two-dimensional information can be recorded in an optical recording medium at a time and this information can be reproduced. Since a plurality of sets of page data can be written in a superposed manner in the same area of a recording medium, it is very effective for recording/reproducing information of a large capacity at high speed.

Hologram recording techniques are described, for example, in JP-A-2004-272268 (Patent Document 1). This publication describes a so-called angle multiplex recording method by which a signal beam is converged to an optical information recording medium via a lens, at the same time a reference beam as a parallel beam is applied to be interfered with the signal beam and record a hologram, and while an incidence angle of the reference beam upon the optical information recording medium is changed, different page data is displayed on a spatial light modulator to perform multiplex recording. This publication also describes the techniques that a space between adjacent holograms can be made short by disposing an aperture or opening (spatial filter) at a beam waist of the signal beam converged by a lens so that recording density/capacity can be increased more than a conventional angle multiplex recording method.

Hologram recording techniques are also described, for example, in WO2004-102542 (Patent Document 2). This publication describes an example utilizing a shift multiplex method. In this method, light from an inner side pixel of one spatial light modulator is used as a signal beam, light from an outer side pixel in a ring stripe is used as a reference beam, both the beams are converged to an optical recording medium via the same lens to make both the beams interfere each other near at a focal point plane of the lens to thereby record a hologram.

DISCLOSURE OF INVENTION

In an optical information recording/reproducing apparatus utilizing holography, it is important to manage a wavelength of a light source when information is recorded/reproduced.

However, prior art does not disclose at all management of a wavelength of a light source when information is recorded/reproduced by utilizing a hologram. Namely, if an optical recording medium expands or contracts due to temperature, a wavelength of an interference fringe in the medium changes. If a usable temperature range is wide, there arises a problem of compatible reproduction ability, and reliability may be lowered.

The present invention has been made in consideration of the above-described problem, and it is an object of the present invention to provide an optical information recording apparatus and method capable of limiting a wavelength of an interference fringe in a medium by managing a wavelength of a light source when information is recorded/reproduced by using holography, and an optical information recording medium.

The object of the present invention can be solved, for example, by providing an optical information recording/reproducing apparatus for applying a light beam from a light source to an optical information recording medium having a recording area for recording information by utilizing holography to record information in the optical information recording medium and/or reproduce information recorded in the optical information recording medium, with a wavelength detector unit for detecting a reference wavelength recorded in the recording area of the optical information recording medium and a wavelength adjustment unit for adjusting a wavelength of the light source in accordance with the reference wavelength detected by the wavelength detector unit for information recording/reproducing.

In configuring the optical information recording/reproducing apparatus, the following elements may be added. The wavelength adjustment unit calculates an optimum wavelength through an interpolation process of reference wavelengths recorded in two wavelength adjustment reference areas disposed in an inner circumference and an outer circumference of the optical information recording medium, among reference wavelengths detected by the wavelength detector unit, and adjusts the wavelength of the light source to have the calculated optimum wavelength. The wavelength adjustment unit calculates an optimum wavelength through a linear interpolation process among a plurality of reference wavelengths detected by the wavelength detector unit, and adjusts the wavelength of the light source to have the calculated optimum wavelength. The apparatus includes further a temperature detector unit for detecting an ambient temperature, wherein the wavelength adjustment unit monitors a temperature detected with the temperature detector unit, and if a temperature change detected before or after wavelength adjustment has a predetermined level, readjusting the wavelength of the light source.

The object of the present invention can be solved, for example, by providing an optical information recording/reproducing method of applying a light beam from a light source to an optical information recording medium having a recording area for recording information by utilizing holography to record information in the optical information recording medium and/or reproduce information recorded in the optical information recording medium, with a wavelength detecting step of detecting a reference wavelength recorded in the recording area of the optical information recording medium and a wavelength adjusting step of adjusting a wavelength of the light source in accordance with the detected reference wavelength for information recording/reproducing.

In configuring the optical information recording/reproducing method, the following elements may be added. The wavelength adjusting step includes a step of calculating an optimum wavelength through an interpolation process of reference wavelengths recorded in two wavelength adjustment reference areas disposed in an inner circumference and an outer circumference of the optical information recording medium, among the detected reference wavelengths, and adjusting the wavelength of the light source to have the calculated optimum wavelength. The wavelength adjusting step includes a step of calculating an optimum wavelength through a linear interpolation process among a plurality of the reference wavelengths, and adjusting the wavelength of the light source to have the calculated optimum wavelength. The method further includes a temperature detecting step of detecting an ambient temperature, wherein the wavelength adjusting step includes a step of monitoring a temperature detected in the temperature detecting step, and if a temperature change detected before or after wavelength adjustment has a predetermined level, readjusting wavelength of the light source.

According to the present invention, a wavelength of an interference fringe in a medium can be limited by managing the wavelength of a light source when information is recorded/reproduced by utilizing holography, and it becomes possible to realize improvement in compatible reproduction ability and reliability.

Other objects, features and advantages of the present invention will become apparent from the following description of embodiments of the present invention in connection with the accompanying description.

BEST MODE FOR CARRYING OUT THE INVENTION

Embodiments of the present invention will now be described.

First Embodiment

Figure 1:
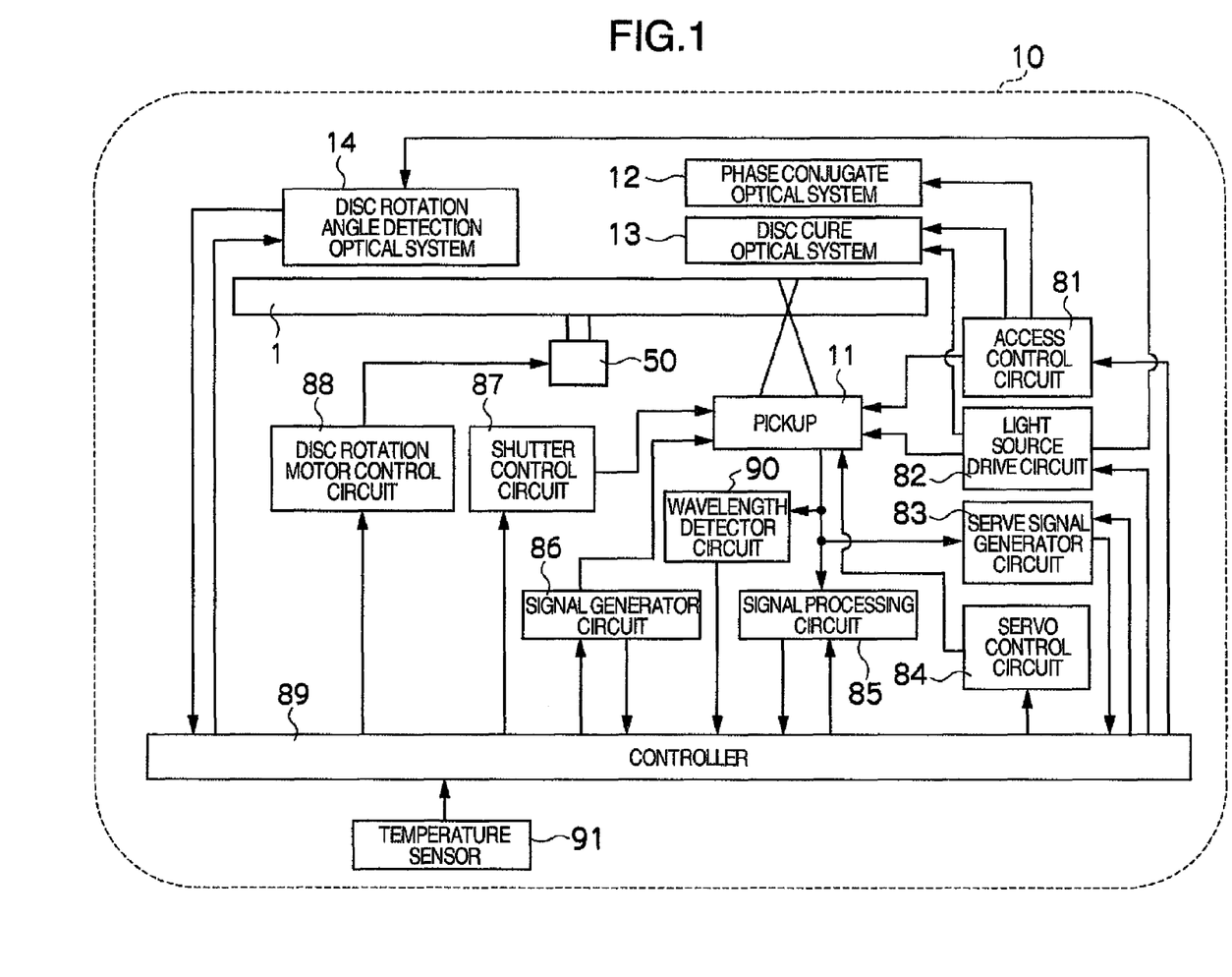
FIG. 1 is a block diagram illustrating the overall structure of an optical information recording/reproducing apparatus according to an embodiment of the present invention.

FIG. 1 shows the overall structure of an optical information recording/reproducing apparatus for recording and/or reproducing digital information by utilizing holography.

In FIG. 1, an optical information recording apparatus 10 is equipped with a pickup 11, a phase conjugate optical system 12, a disc cure optical system 13, a disc rotation angle detection optical system 14 and a motor 50, and an optical information recording medium 1 has a structure capable of being rotated by the motor 50.

The pickup 11 plays a role of recording digital information by emitting a reference beam and a signal beam to the optical information recording medium 1 and by utilizing holography. In this case, a controller 89 sends an information signal beam to a spatial light modulator in the pickup to be described later, via a signal generator circuit 86, and the signal beam is modulated by the spatial light modulator.

In reproducing information recorded in the optical information recording medium 1, a phase conjugate optical system 12 generates a phase conjugate beam of the reference beam emitted from the pickup 11. The conjugate beam is an optical beam having the same wavefront as that of the input beam and propagating in a direction opposite to that of the input beam. A reproduction beam reproduced by the phase conjugate beam is detected with a photodetector in the pickup 1 to be described later, and reproduced by a signal processing circuit 85.

An application time of the reference beam and signal beam applied to the optical information recording medium 1 can be adjusted in such a manner that the controller 89 controls an open/close time of a shutter in the pickup 11 to be described later via a shutter control circuit 87.

A disc curing optical system 13 has a role of generating an optical beam to be used for pre-cure and post-cure of the optical information recording medium 1. Pre-cure is a pre-process of, when information is to be recorded in the optical information recording medium 1 at a desired position, applying a predetermined optical beam before the reference beam and signal beam are applied to the desired position. Post-cure is a post-process of, after information is recorded in the optical information recording medium 1 at a desired position, applying a predetermined optical beam to the desired position in order to make unable to overwrite information at the desired position.

A disc rotation angle detecting optical system 14 is used for detecting a rotation angle of the optical information recording medium 1. In adjusting the optical information recording medium 1 to have a predetermined rotation angle, the disc rotation angle detecting optical system 14 detects a signal corresponding to a rotation angle, and by using the detected signal, the controller 89 can control a rotation angle of the optical information recording medium 1 via a spindle motor control circuit 88.

A light source drive circuit 82 supplies a predetermined light source drive current to light sources in the pickup (optical pickup) 11, disc curing optical system 13 and disc rotation angle detecting optical system 14, and each of the light sources can emit an optical beam having a predetermined light quantity.

The pickup 11, phase conjugate optical system 12 and disc curing optical system 13 have each a mechanism for sliding a position of the optical information recording medium 1 in a radial direction, to perform position control via an access control circuit 81.

In reproducing information recorded in the optical information recording medium 1, a reflected beam from the optical information recording medium 1 is converted into an electric signal which is transmitted to a signal processing circuit 85. In the above-described recording/reproducing, a serve signal generator circuit 83 and a serve control circuit 84 perform autofocus of an optical spot on the optical information recording medium 1 and tracking of the optical spot on a track (guide groove).

A wavelength detector circuit 90 is constituted of a wavelength detector unit for extracting a reproduction beam, a reference beam or a signal beam from the pickup 11 during information recording/reproducing, and detecting a reference wavelength recorded as a reference mark (interference fringe) in a recording area of the optical information recording medium 1, and outputs a detected reference wavelength.

In accordance with the reference wavelength detected with the wavelength detector circuit 90, the controller 89 adjusts the wavelength of each beam of the pickup 11 via a light source drive circuit 82 during information recording/reproducing. In this case, the controller monitors a temperature detected with a temperature sensor 91 constituted of a temperature detector unit for detecting an ambient temperature (environment temperature), and if a temperature detected before or after wavelength adjustment changes in a predetermined manner, the wavelength of each beam is readjusted.

Recording techniques utilizing holography can record ultra high density information. Therefore, for example, there is the tendency that an allowable margin of an inclination and a position displacement of the optical information recording medium 1 becomes very small. Therefore, a mechanism for detecting a shift amount having a small allowable margin such as an inclination and a position displacement of the optical information recording medium 1 may be built in the pickup 11, a servo signal generator circuit 83 generates a servo control signal, and a servo mechanism for compensating for the shift via a servo control circuit 84 may be built in the optical information recording/reproducing apparatus 10.

The pickup 11, disc cure optical system 13 and disc rotation angle detecting optical system 14 may be constituted of several optical systems, or all optical systems may be a single optical system to simplify the structure.

Figure 2:
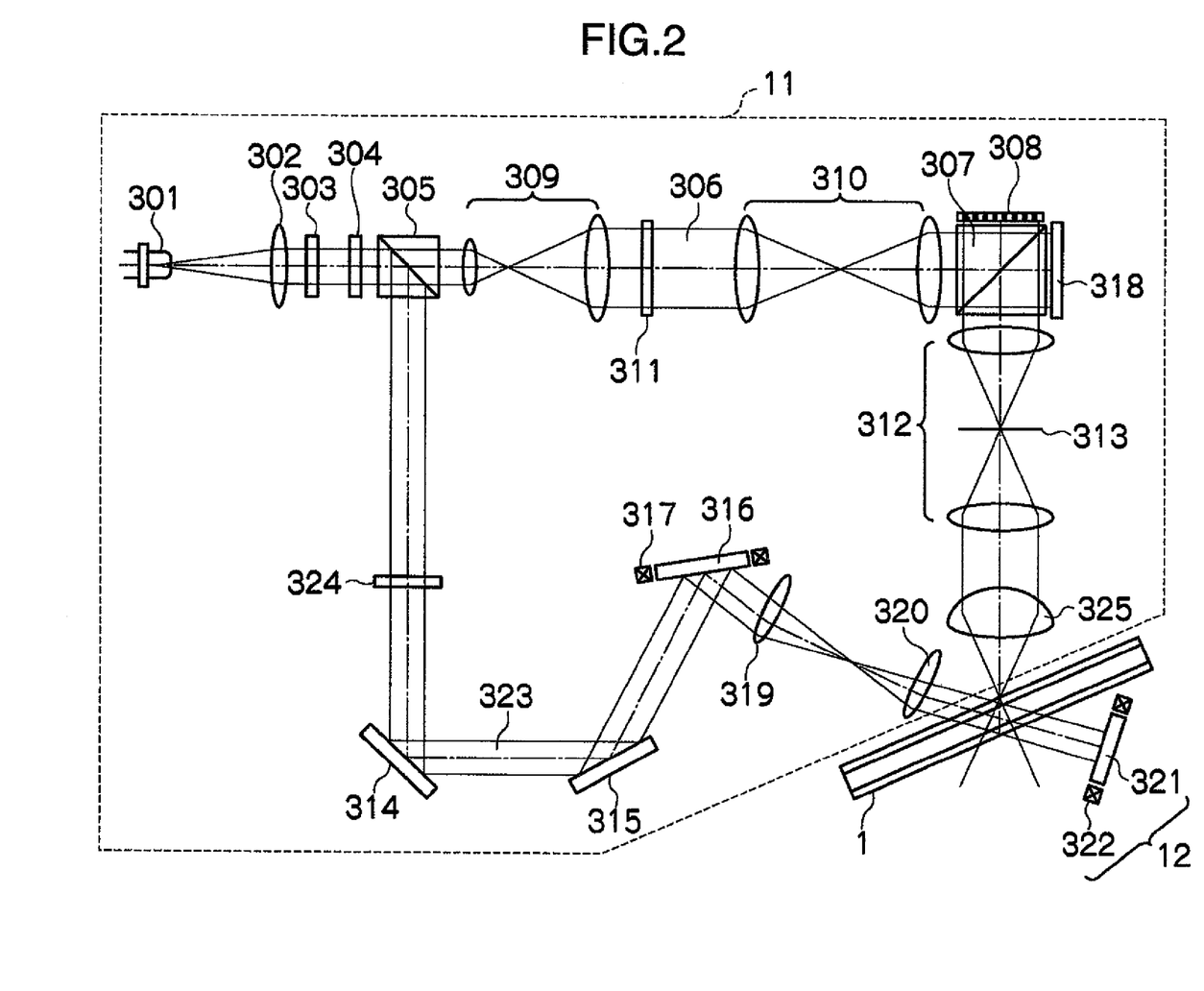
FIG. 2 is a diagram illustrating the structure of a pickup optical system of the optical information recording/reproducing apparatus.

FIG. 2 illustrates an example of the optical system structure of the pickup 11 of the optical information recording/reproducing apparatus 10. In FIG. 2, a light beam emitted from a light source 301 transmits through a collimate lens 302 and enters a shutter 303. While the shutter 303 opens, the light beam passes through the shutter 303, an optical element 304 constituted of, e.g., a half wavelength plate controls a polarization direction to make P polarized light and S polarized light have a desired light amount ratio, and thereafter the light beam enters a polarization beam splitter (PBS) prism 305.

A diameter of the light beam transmitted through the PBS prism 305 is made larger by a beam expander 309, and the light beam transmits through a phase mask 311, a relay lens 310 and a PBS prism 307 and enters a spatial light modulator 308.

A signal light beam added with information by the spatial light modulator 308 reflects at the PBS prism 307, and propagates through a relay lens 312 and a spatial filter 313. Thereafter, the signal light beam is converged upon the optical information recording medium 1 by an objective lens 325.

On the other hand, a light beam reflected at the PBS prism 305 functions as a reference light beam, is set with a predetermined polarization direction for recording or reproducing by a polarization conversion element 324, and enters a galvano mirror 316 via mirrors 314 and 315. Since an angle of the galvano mirror 316 can be adjusted by an actuator 317, an incidence angle of the reference light beam incident upon the information recording medium 1 after the light beam transmitted through lenses 319 and 320 can be set to a desired angle.

The signal light beam and reference light beam are applied being stacked mutually in the optical information recording medium 1 to form an interference pattern in the recording medium. By writing this pattern in the recording medium, information can be recorded. Further, angle multiplexing recording is possible because the galvano mirror 316 can change an incidence angle of the reference light beam incident upon the optical information recording medium 1.

In reproducing recorded information, the reference light beam is applied to the optical information recording medium 1 in the manner described above, and the light beam transmitted through the optical information recording medium 1 is reflected at a galvano mirror 316 to generate phase conjugate light of the reference light.

A light beam reproduced by the phase conjugate light propagates through the objective lens 325, relay lenses 312 and spatial filter 313. Thereafter, the reproduced light beam transmits through the PBS prism 307 and enters a photodetector 318 so that the recorded signal can be reproduced.

Figure 3A:
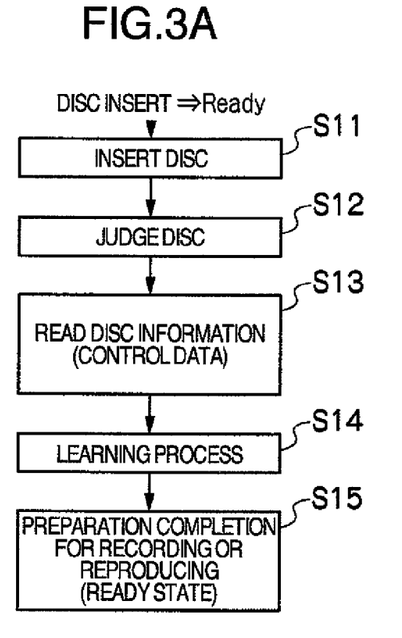
FIG. 3A is a flow chart for explaining an operation flow of recording and reproducing of the optical information recording/reproducing apparatus.
Figure 3B:
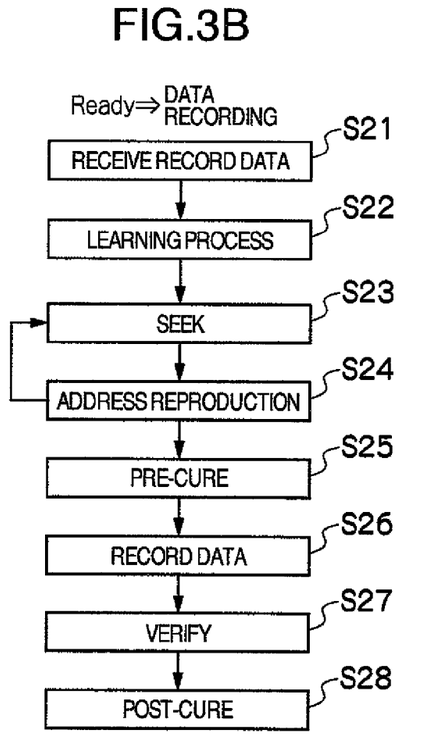
FIG. 3B is a flow chart for explaining an operation flow of recording and reproducing of the optical information recording/reproducing apparatus.
Figure 3C:
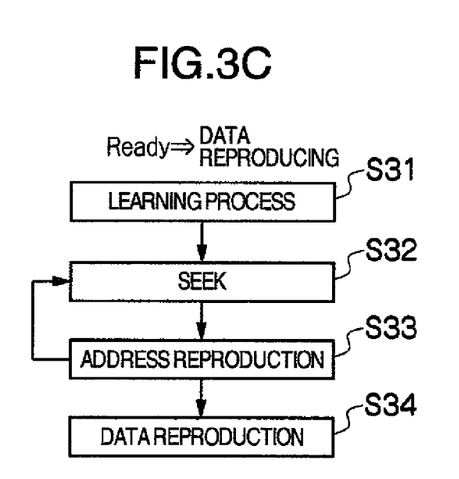
FIG. 3C is a flow chart for explaining an operation flow of recording and reproducing of the optical information recording/reproducing apparatus.

FIGS. 3A to 3C show recording/reproducing operation flows of the optical information recording/reproducing apparatus 10. Description will be made on the recording/reproducing operation flows utilizing holography.

FIG. 3A shows an operation flow from insertion of the optical information recording medium 1 into the optical information recording/reproducing apparatus 10 to completion of preparation for recording or reproducing, FIG. 3B shows an operation flow from the preparation completion state to recording information in the optical information recording medium 1, and FIG. 3C shows an operation flow from the preparation completion state to reproducing information recorded in the optical information recording medium 1.

As shown in FIG. 3A, as a medium is inserted (S11), the optical information recording/reproducing apparatus 10 judges whether the inserted medium is, for example, a medium for recording or reproducing digital information by utilizing holography (S12).

If the disc judgment result indicates an optical information recording medium for recording or reproducing digital information by utilizing holography, then the optical information recording/reproducing apparatus 10 reads control data provided in the optical information recording medium (S13), to acquire, for example, information on the optical information recording medium and information on various setting conditions during recording and reproducing.

After the control data is read, various adjustments corresponding to the control data and learning processes for the pickup 11 are performed (S14) so that the optical information recording/reproducing apparatus 10 completes preparation for recording or reproducing (S15).

In the operation flow from the preparation completion state to recording information, as shown in FIG. 3B data to be recorded is first received, and information corresponding to the received data is sent to the spatial light modulator 308 in the pickup 11 (S21). Thereafter, various learning processes are executed beforehand if necessary (S22) in order to allow high quality information to be recorded in the optical information recording medium, and while a seek operation (S23) and an address reproduction operation (S24) are repetitively performed, the pickup 11 and disc curing optical system 13 are disposed at predetermined positions of the optical information recording medium.

Thereafter, by using an optical beam emitted from the disc curing optical system 13, a predetermined area is pre-cured (S25), and data is recorded by using a reference beam and a signal beam emitted from the pickup 11 (S26).

After the data is recorded, data is verified if necessary (S27), and post-cure is performed by using an optical beam emitted from the disc curing optical system 13 (S28).

In the operation flow from the preparation completion state to reproducing information, as shown in FIG. 3C various learning processes are executed beforehand if necessary in order to allow high quality information to be reproduced from the optical information recording medium (S31). Thereafter, while a seek operation (S32) and an address reproduction operation (S33) are repetitively performed, the pickup 11 and phase conjugate optical system 12 are disposed at predetermined positions of the optical information recording medium.

Thereafter, by making the pickup 11 emit a reference beam, information recorded in the optical information recording medium is read to reproduce data (S34).

Figure 4:
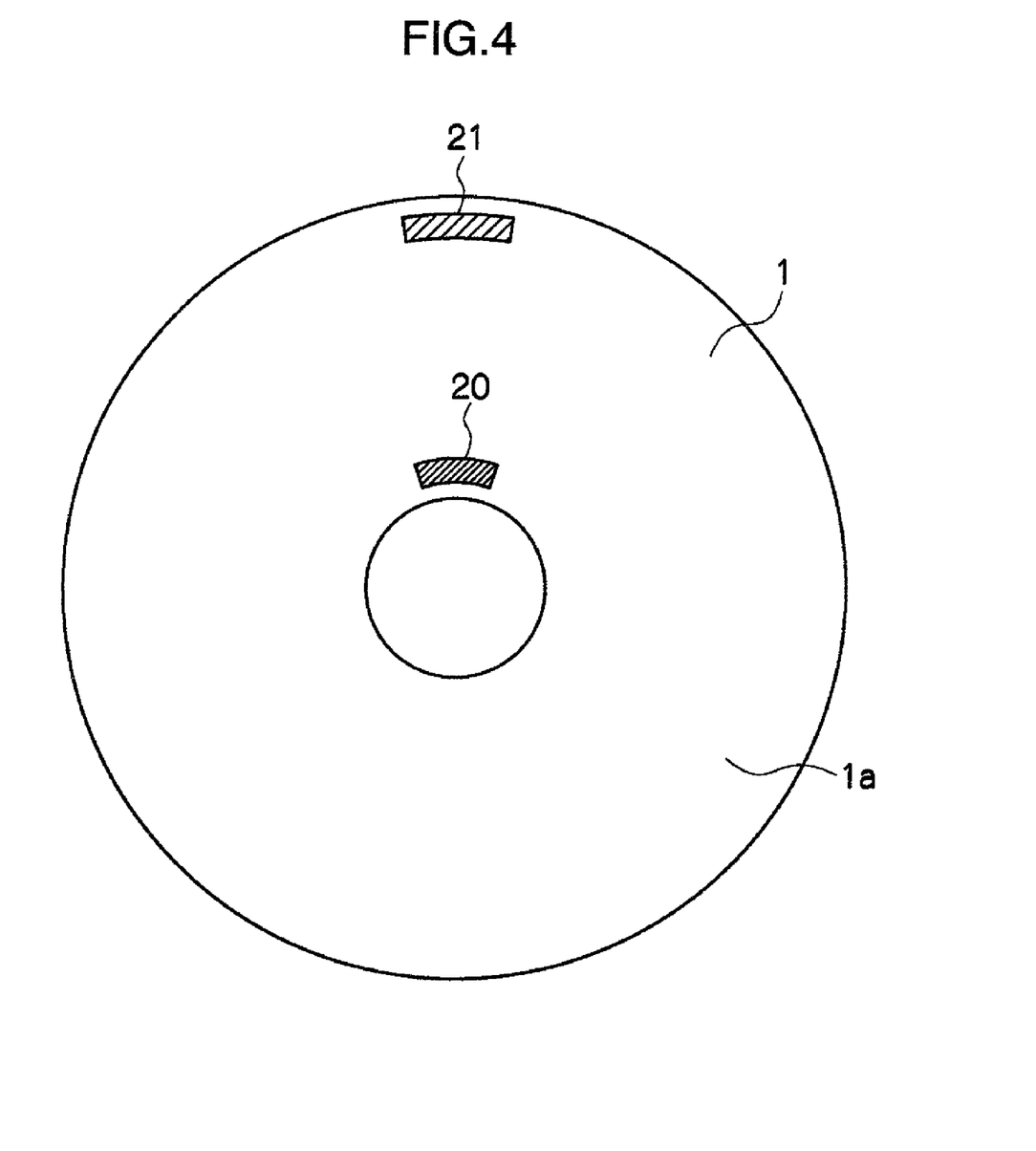
FIG. 4 is a diagram illustrating the structure of an optical information recording medium disposing two wavelength measurement reference areas in a recording area.

FIG. 4 illustrates an example of the structure of an optical information recording medium 1 provided with two wavelength adjustment reference areas. In FIG. 4, a wavelength adjustment reference area 20 recorded with a reference wavelength as a reference mark (interference fringe) pattern is disposed on an inner circumference side of a recording area 1a of the optical information recording medium 1, and disposed on an outer circumference side is a wavelength adjustment reference area 21 recorded with a reference wavelength as a reference mark (interference fringe) pattern.

Figure 5:
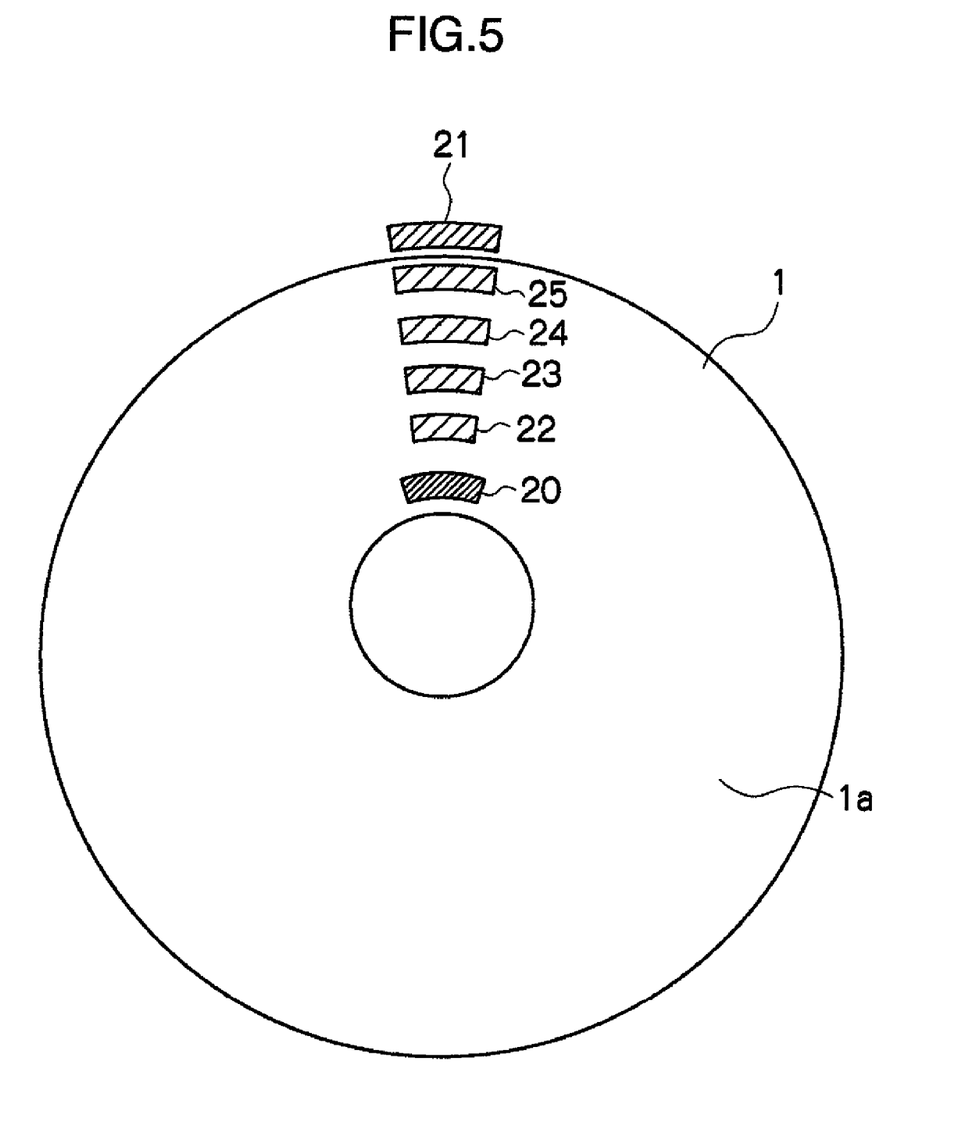
FIG. 5 is a diagram illustrating the structure of an optical information recording medium disposing six wavelength measurement reference areas in a recording area.

FIG. 5 illustrates an example of the structure of an optical information recording medium 1 provided with six wavelength adjustment reference areas along a radial direction. In FIG. 5, a wavelength adjustment reference area 20 recorded with a reference wavelength as a reference mark (interference fringe) pattern is disposed on an inner circumference side of a recording area 1a of the optical information recording medium 1, and disposed on an outer circumference side is a wavelength adjustment reference area 21 recorded with a reference wavelength as a reference mark (interference fringe) pattern. Four wavelength adjustment reference areas 22, 23, 24 and 25 each recorded with a reference wavelength as a reference mark (interference fringe) pattern are disposed between the wavelength adjustment reference areas 20 and 21 along the radial direction of the optical information recording medium 1.

Figure 6:
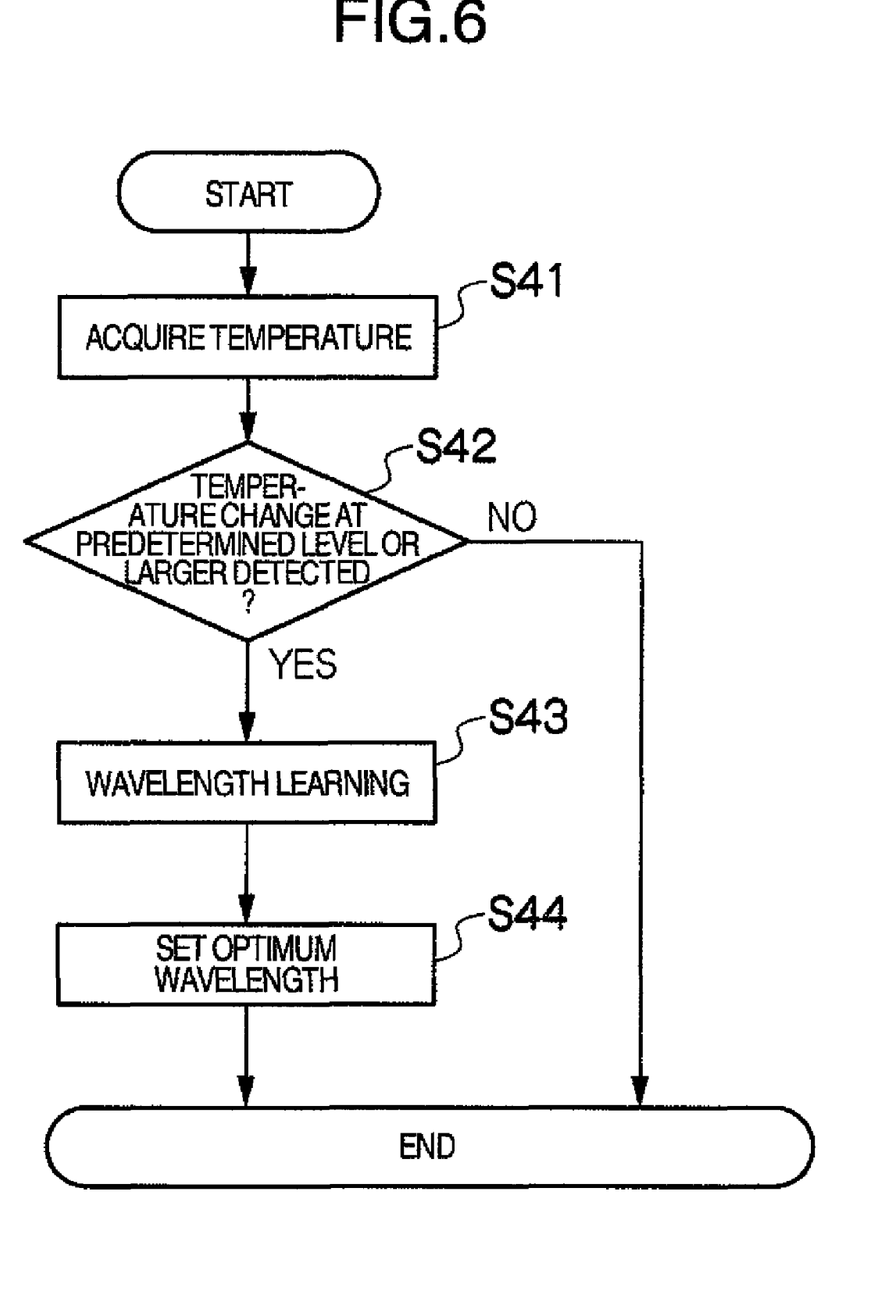
FIG. 6 is a flow chart for explaining a wavelength learning process of the optical information recording/reproducing apparatus during recording/reproducing.

FIG. 6 illustrates an operation flow of a wavelength learning process during information recording/reproducing of the optical information recording/reproducing apparatus. In FIG. 6, during recording/reproducing of information regarding the optical information recording medium 1 by the optical information recording/reproducing apparatus 10, the controller 89 acquires a temperature detected with the temperature sensor 91 (S41), and judges whether a temperature change of a predetermined level or larger is detected, in order to judge whether a temperature detected before or after wavelength adjustment changes the predetermined level (S42).

If a temperature change at the predetermined level or larger is not detected, the controller 89 terminates this routine process, whereas if a temperature change at the predetermined level or larger is detected, the process transits to a wavelength learning process (S43) whereat an optimum wavelength is obtained in accordance with a wavelength obtained by the wavelength learning process. A wavelength of each light source, e.g., the light source 301, is adjusted to the optimum wavelength (S44) to thereafter terminate this routine process. Similar to the case in which a temperature change at the predetermined level or larger is detected, the wavelength adjustment of the light source 301 is performed when a disc is inserted.

Figure 7:
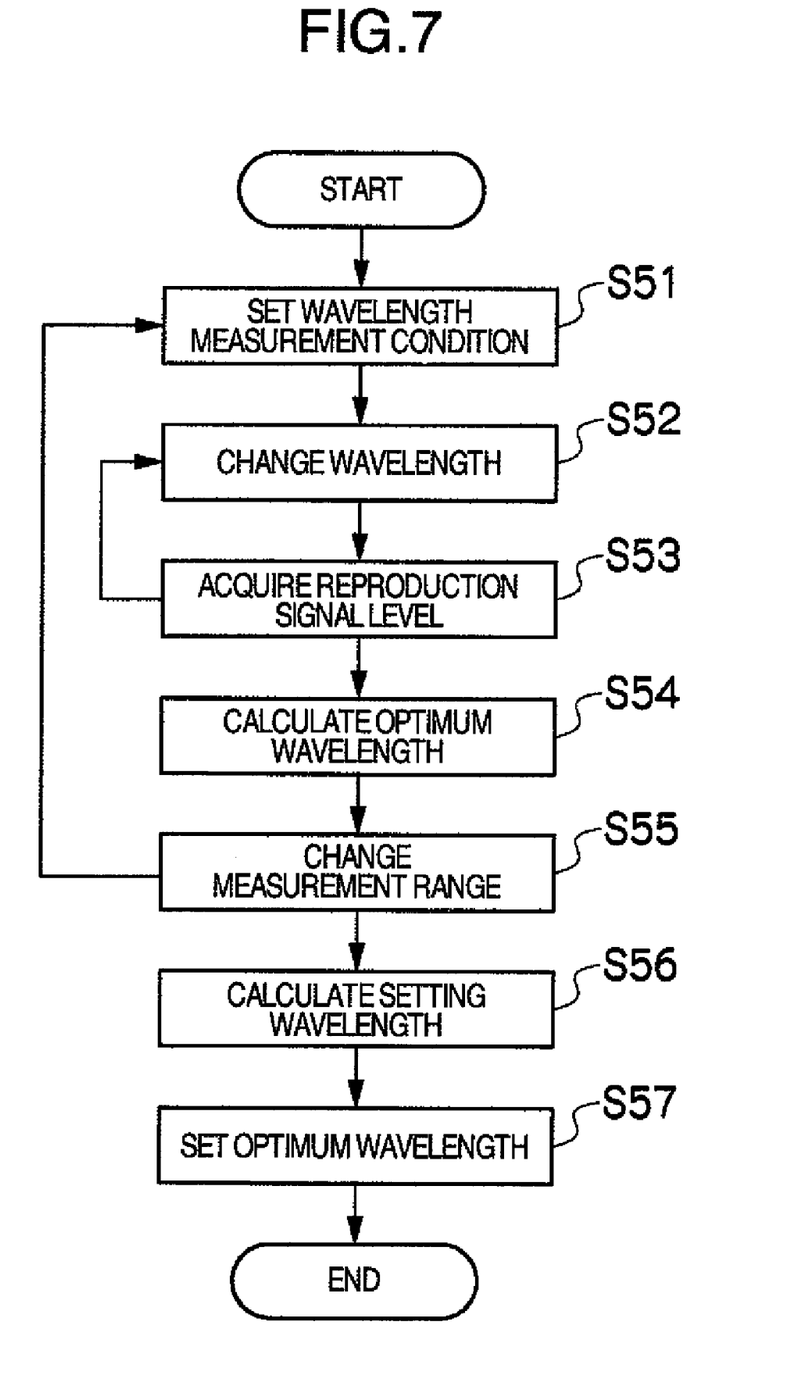
FIG. 7 is f flow chart for explaining a wavelength learning process by the optical information recording/reproducing apparatus.

FIG. 7 illustrates a wavelength learning flow by the optical information recording/reproducing apparatus 10. In FIG. 7, when the controller 89 executes a wavelength learning process for recording/reproducing of information regarding the optical information recording medium 1 by the optical information recording/reproducing apparatus 10, first the controller 89 sets a wavelength measurement condition to the wavelength detector circuit 90 (S51), changes a wavelength of the light source (S52), acquires a reproduction signal level detected by the pickup 11 (S53), and executes a calculation process for an optimum wavelength in accordance with the wavelength detected by the wavelength detector circuit 90 (S54).

Figure 8:
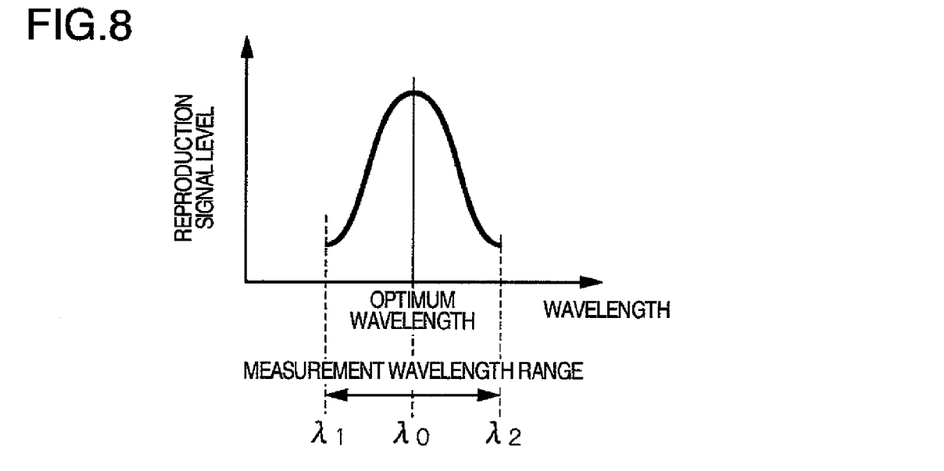
FIG. 8 is a characteristic diagram for explaining an optimum wavelength calculating method for the optical information recording/reproducing apparatus.
Figure 9:
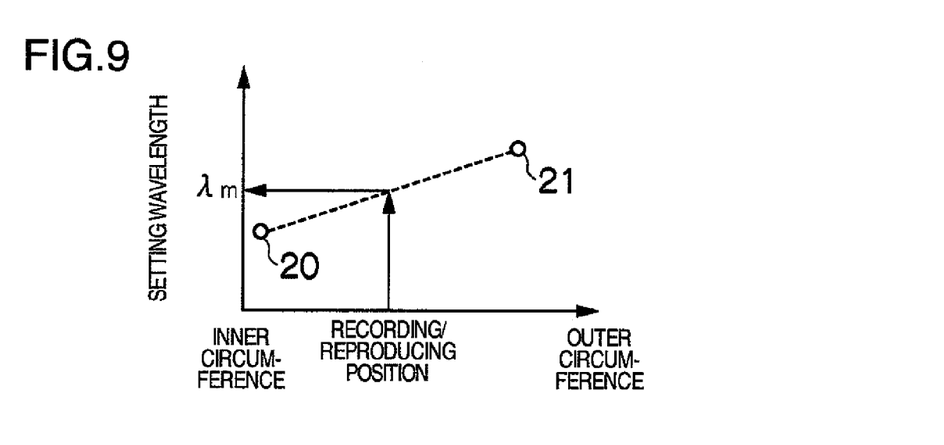
FIG. 9 is a characteristic diagram for explaining a setting wavelength calculating method for the optical information recording/reproducing apparatus.
Figure 10:
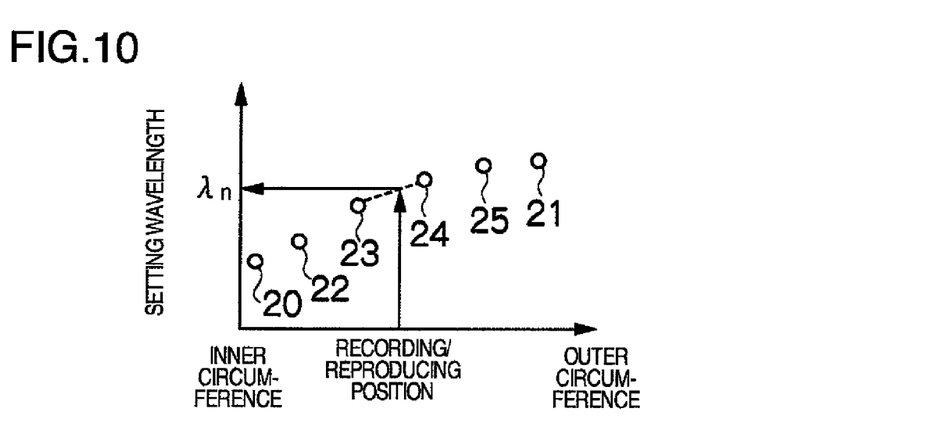
FIG. 10 is a characteristic diagram for explaining a setting wavelength calculating method for the optical information recording/reproducing apparatus.

In this case, in accordance with a reproduction signal level of a reference beam detected with the wavelength detector circuit 90, as illustrated in FIG. 8, the controller 89 sets a measurement wavelength range to a range between wavelengths $\lambda 1$ and $\lambda 2$, and obtains as an optimum wavelength $\lambda 0$ a wavelength, among those belonging to the range between wavelengths $\lambda 1$ and $\lambda 2$, having a highest level (highest intensity) of the reproduction signal. If the measurement range is required thereafter to be changed, the controller 89 returns to Step S51 whereat the measurement range in the wavelength measurement condition is changed to thereafter repeat the processes S51 to S54 (S55). If the measurement range is not required thereafter to be changed, a process for calculating a setting wavelength to a currently mounted optical information recording medium is executed (S56).

For example, if the optical signal recording medium 1 illustrated in FIG. 4 is used as the optical information recording medium 1, the controller 98 obtains an optimum wavelength $\lambda m$ through an interpolation process between reference wavelengths obtained from the wavelength adjustment reference areas 20 and 21.

On the other hand, if the optical signal recording medium 1 illustrated in FIG. 5 is used as the optical information recording medium 1, the controller 98 obtains an optimum wavelength $\lambda n$ through a linear interpolation process among reference wavelengths recorded in the wavelength adjustment reference areas 20 to 25 disposed in the recording area 1a of the optical information recording medium 1.

Next, when an optimum wavelength is to be set to the optical information recording medium 1 illustrated in FIG. 4, the controller 89 sets the wavelength $\lambda m$ as the optimum wavelength, and when an optimum wavelength is to be set to the optical information recording medium 1 illustrated in FIG. 5, the controller 89 sets the wavelength $\lambda n$ as the optimum wavelength, to thereby adjust a wavelength of each light source to the optimum wavelength $\lambda m$ or $\lambda n$ and thereafter terminate this routine process.

According to the embodiment, a light beam is applied from each light source to the optical information recording medium 1 having the recording area 1a in which information is recorded by utilizing holography, to thereby record information and/or reproduce information recorded in the optical information recording medium 1. For this recording/reproducing process, in accordance with the reference wavelength detected with the wavelength detector circuit 90, the controller 89 adjusts a wavelength of each light source to have an optimum wavelength. It is therefore possible to limit a wavelength of an interference fringe in the optical information recording medium 1 and realize improvement in compatible reproduction ability and reliability.

Since adjustment is performed by using a wavelength in the medium at a plurality of positions of a disc, it is possible to deal with a change in expansion and contraction of the medium with its position and realize reliable recording/reproducing.

According to the embodiment, if a temperature detected with the temperature sensor 91 has a predetermined level, even after the wavelength of each light source is adjusted to have an optimum wavelength, the controller readjusts the wavelength of each light source to have an optimum wavelength. It is therefore possible to limit the wavelength of an interference fringe in the optical information recording medium 1 to have always a predetermined value.

According to another embodiment, a reference mark representative of a wavelength recommended by a disc maker may be disposed at a predetermined position in a medium, and the drive may tune the wavelength of each light source by utilizing the reference mark, at the time of initialization or when a temperature change is at a predetermined level or larger.

According to this embodiment, it is advantageous that the drive is not necessary to perform test writing during wavelength tuning. As an improvement in this embodiment, although tuning at the initial stage is performed by utilizing the reference mark recommended by a disc maker, if it is judged thereafter that there is a better wavelength for the drive, a new mark representative of the wavelength judged better may be recorded, and tuning may be performed thereafter by utilizing the new reference mark. It is possible therefore to record/reproduce information at a wavelength more suitable for the drive.

The description given so far has been made in connection with the embodiments. The present invention is not limited to the embodiments, but it is apparent for those skilled in the art that various alterations and modifications may be made without departing from the spirit of the present invention and from the appended claims.

The invention claimed is:

1. An optical information recording/reproducing apparatus for applying a light beam from a light source to an optical information recording medium having a recording area for recording information by utilizing holography to record information in said optical information recording medium and/or reproduce information recorded in said optical information recording medium, the optical information recording/reproducing apparatus comprising a wavelength detector unit for detecting a reference wavelength recorded in said recording area of said optical information recording medium and a wavelength adjustment unit for adjusting a wavelength of said light source in accordance with the reference wavelength detected by said wavelength detector unit for information recording/reproducing,
wherein said wavelength adjustment unit calculates an optimum wavelength through an interpolation process among a plurality of reference wavelengths detected by said wavelength detector unit, and adjusts the wavelength of said light source to have said calculated optimum wavelength.

2. The optical information recording/reproducing apparatus according to claim 1, wherein said wavelength adjustment unit calculates an optimum wavelength through an interpolation process of reference wavelengths recorded in two wavelength adjustment reference areas disposed in an inner circumference and an outer circumference of said optical information recording medium, among reference wavelengths detected by said wavelength detector unit, and adjusts the wavelength of said light source to have said calculated optimum wavelength.

3. The optical information recording/reproducing apparatus according to claim 1, further comprising a temperature detector unit for detecting an ambient temperature, wherein said wavelength adjustment unit monitors a temperature detected with said temperature detector unit, and if a temperature change detected before or after wavelength adjustment has a predetermined level, readjusting the wavelength of said light source.

4. An optical information recording/reproducing method of applying a light beam from a light source to an optical information recording medium having a recording area for recording information by utilizing holography to record information in said optical information recording medium and/or reproduce information recorded in said optical information recording medium, the optical information recording/reproducing method comprising a wavelength detecting step of detecting a reference wavelength recorded in said recording area of said optical information recording medium and a wavelength adjusting step of adjusting a wavelength of said light source in accordance with said detected reference wavelength for information recording/reproducing,
wherein said wavelength adjusting step includes a step of calculating an optimum wavelength through an interpolation process among a plurality of said reference wavelengths, and adjusting the wavelength of said light source to have said calculated optimum wavelength.

5. The optical information recording/reproducing method according to claim 4, wherein said wavelength adjusting step includes a step of calculating an optimum wavelength through an interpolation process of reference wavelengths recorded in two wavelength adjustment reference areas disposed in an inner circumference and an outer circumference of said optical information recording medium, among said detected reference wavelengths, and adjusting the wavelength of said light source to have said calculated optimum wavelength.

6. The optical information recording/reproducing method according to claim 4, further comprising a temperature detecting step of detecting an ambient temperature, wherein said wavelength adjusting step includes a step of monitoring a temperature detected in said temperature detecting step, and if a temperature change detected before or after wavelength adjustment has a predetermined level, readjusting wavelength of said light source.

7. An optical information recording/reproducing apparatus for applying a light beam from a light source to an optical information recording medium having a recording area for recording information by utilizing holography to record information in said optical information recording medium and/or reproduce information recorded in said optical information recording medium, the optical information recording/reproducing apparatus comprising
    a wavelength detector unit for detecting a reference wavelength recorded in said recording area of said optical information recording medium and a wavelength adjustment unit for adjusting a wavelength of said light source in accordance with the reference wavelength detected by said wavelength detector unit for information recording/reproducing and
    a temperature detector unit for detecting an ambient temperature, wherein
    said temperature detector unit detect a first temperature before or after wavelength adjustment, said wavelength adjustment unit monitors a second temperature detected with said temperature detector unit, and if a temperature change of the first temperature detected before or after wavelength adjustment has a predetermined level change when compared with the monitored second temperature, readjusting the wavelength of said light source within a reference region of wavelength adjustment of said optical information recording medium.

8. An optical information recording/reproducing method of applying a light beam from a light source to an optical information recording medium having a recording area for recording information by utilizing holography to record information in said optical information recording medium and/or reproduce information recorded in said optical information recording medium, the optical information recording/reproducing method comprising
    a wavelength detector step of detecting a reference wavelength recorded in said recording area of said optical information recording medium and a wavelength adjusting step of adjusting a wavelength of said light source in accordance with said detected reference wavelength for information recording/reproducing and
    a temperature detecting step of detecting an ambient temperature, wherein
    said temperature detecting step includes a step of detecting a first temperature before or after wavelength adjustment said wavelength adjusting step includes a step of monitoring a second temperature detected with said temperature detecting step, and if a temperature change of said first temperature detected before or after wavelength adjustment has a predetermined level change when compared with the said monitored second temperature, readjusting wavelength of said light source within a reference region of wavelength adjustment of said optical information recording medium.

* * * * *